Sept. 5, 1939.   L. W YOUNG   2,172,313
AUTOMATIC REPRODUCING PROCESS AND MACHINE
Filed June 15, 1935   3 Sheets-Sheet 3
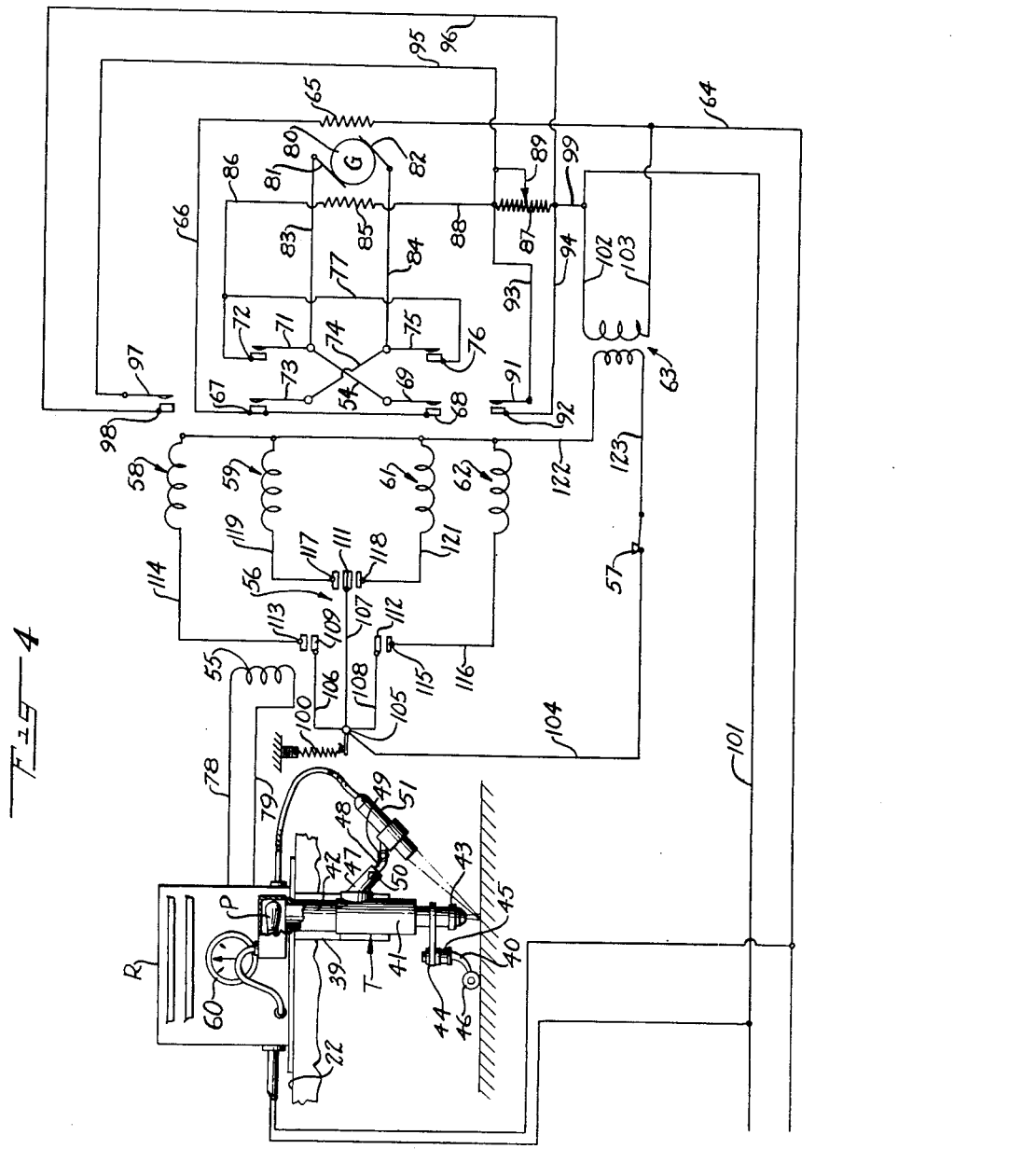
INVENTOR.
LLOYD W. YOUNG
BY
*E L Greenewald*
ATTORNEY.

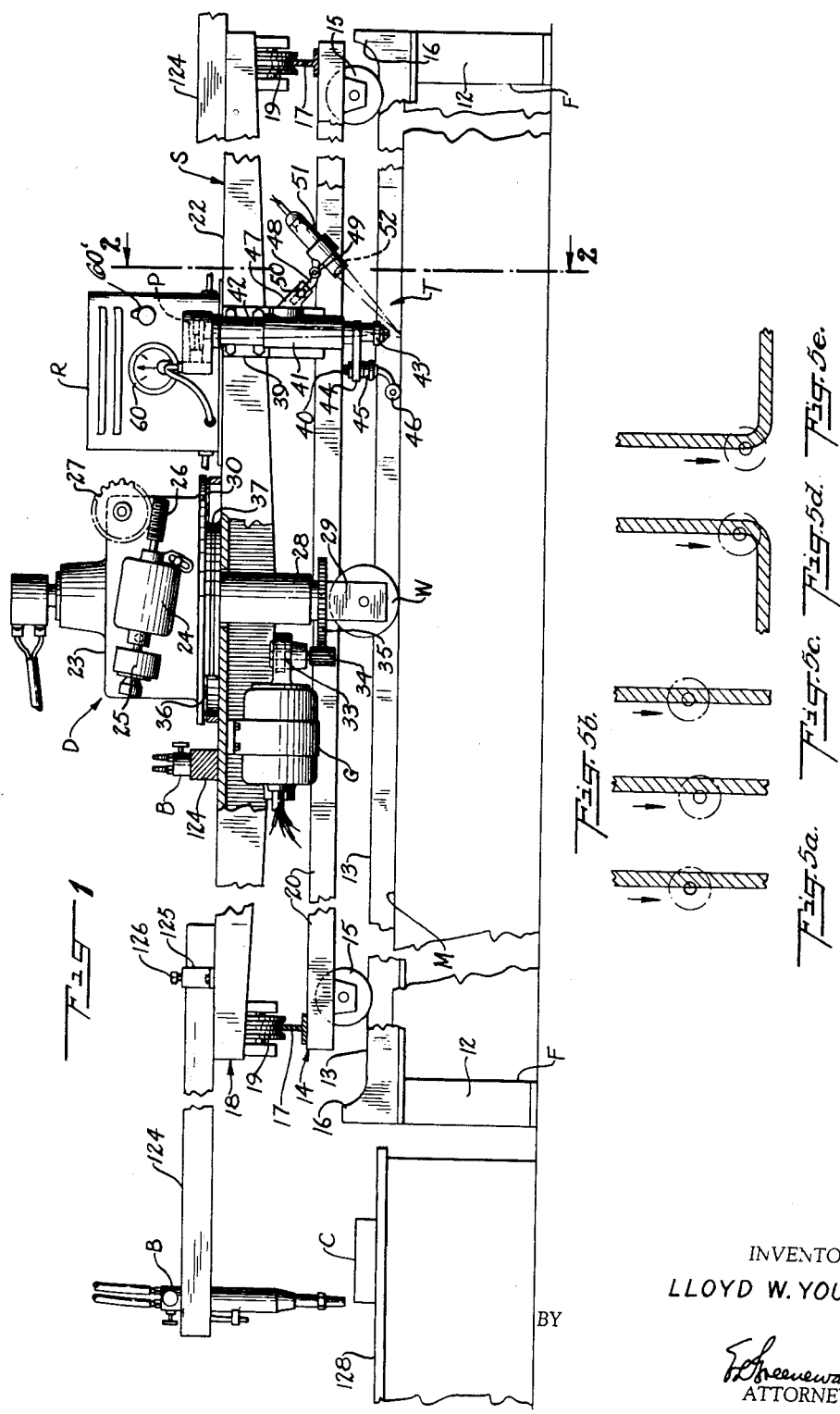

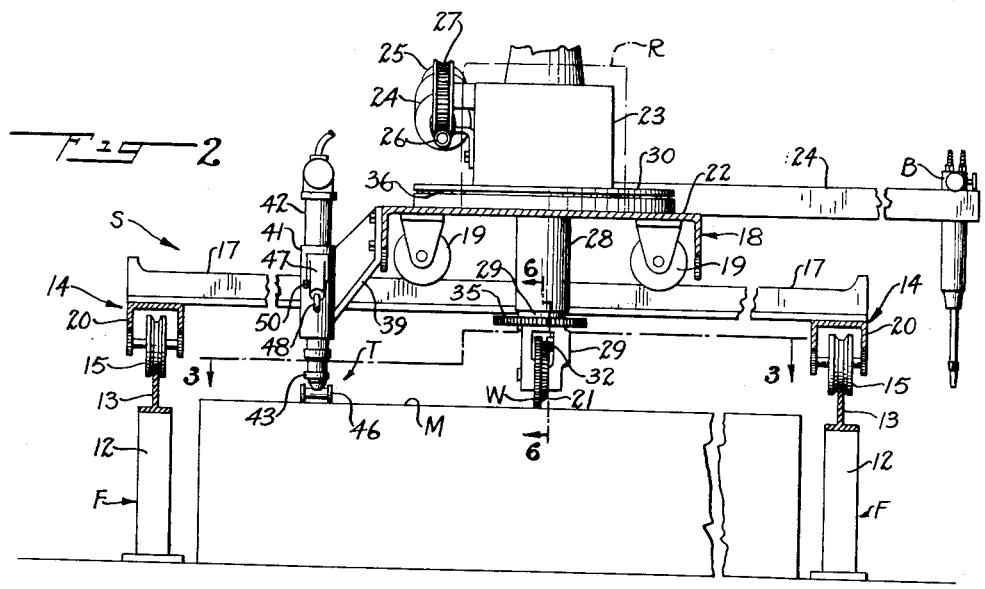

Patented Sept. 5, 1939

2,172,313

UNITED STATES PATENT OFFICE 2,172,313

AUTOMATIC REPRODUCING PROCESS AND MACHINE

Lloyd W. Young, Scotch Plains, N. J., assignor, by mesne assignments, to Union Carbide and Carbon Corporation, a corporation of New York Application June 15, 1935, Serial No. 26,773

24 Claims. (Cl. 266—23)

This invention relates to automatic reproducing processes and machines, such as those adapted to trace and reproduce a figure drawn upon a background of contrasting color. More particularly, the invention relates to a process and machine for propelling and automatically guiding cutting or welding means to produce a cut or a weld similar to a predetermined pattern or outline.

In some mechanisms for reproducing figures and outlines, a tracing device or pointer is manually guided along the contour of the outline and, when the outline is on a surface such as an ordinary drawing, the personal error and unsteadiness of the operator in manipulating the pointer causes the associated reproducing tool to deviate correspondingly. The reproduction is therefore frequently inaccurate; the operation is slow; and, since the pointer is quite close to and often engages the templet or drawing, the latter is subject to wear and mutilation.

In order to make reproductions more rapidly and accurately, mechanisms are provided in which the tracer is designed to automatically follow a prescribed path such as a rail or a groove that is engageable by and guides the tracer and the reproducing tool connected thereto. Such tracers may be electrically driven to propel the reproducing tool faster and with greater uniformity and accuracy. Templets for such automatic reproducing mechanisms are ordinarily made of rigid material, such as fiberboard, wood, or metal, and the desired contour or pattern is provided by forming a groove in or a raised guide or rail upon the templet material to provide an edge for guiding the tracer in the desired path. Such templets have numerous undesirable features. They are expensive to prepare; cumbersome to handle and store; cannot be revised easily; are not easily duplicated; and are subject to considerable wear by the tracer, resulting in a relatively short useful life.

The main object of this invention is to provide an improved machine for automatically reproducing outlines or patterns which overcomes the objectionable features recited above. More specifically, the objects of this invention are: to provide a machine adapted to automatically reproduce an outline or figure directly from a drawing or the like; to perform the operation speedily and accurately while eliminating the inefficiencies of manual reproduction and the wear and tear to which drawings and templets have heretofore been subjected; and to reduce the cost of preparing, altering, duplicating, handling, and storing prior forms of rigid templets made of metal, wood or the like. It is a further object of this invention to provide an improved apparatus and procedure for automatically producing a cut or a weld exactly similar to a predetermined outline or pattern, such as a drawing upon a background of contrasting color. The above and other objects and the novel features of this invention will be apparent from the following description taken with the accompanying drawings, in which:

Fig. 1 is an elevational view of a machine embodying this invention, with certain portions illustrated in cross section;

Fig. 2 is a transverse cross-sectional view of the machine taken on the lines 2—2 of Fig. 1;

Fig. 3 is a plan view of a typical templet with portions of the machine shown in cross-section as taken along the lines 3—3 of Fig. 2;

Fig. 4 is a combined diagrammatic view of the tracing mechanism, and wiring diagram of the controlling mechanism;

Fig. 5a, Fig. 5b, Fig. 5c, Fig. 5d, and Fig. 5e are diagrammatic views illustrating conditions characteristic of the operation of the machine; and Fig. 6 is an enlarged vertical section of the driving mechanism, taken on lines 6—6 of Fig. 2.

This invention is herein disclosed as applied to a reproducing machine of a type similar to the automatic shape-cutting machine shown and described in United States Patent No. 1,774,865 issued September 2, 1930 in the name of Isaiah Allison, but the novel principles may be applied in pantographic and reproducing machines generally, in which the reproducing tool may take such forms as a welding or heating device, an engraving or drawing instrument, a cutting or profiling tool, a pyrographic needle, and so forth. The principles of the invention may be employed wherever it is desirable to guide any mechanism in a prescribed course.

Generally speaking, a machine embodying the invention comprises a suitable supporting mechanism S, such as a pantographic structure or a double carriage structure similar to the one shown in Patent No. 1,774,865, upon which the other parts of the machine may be mounted to move in all directions in a horizontal plane. The supporting mechanism S carries the tracer mechanism T, the drive mechanism D, and the reproducing tool which is here shown as a cutting blowpipe B. The supporting structure S is mounted upon a stationary frame F and is propelled at a uniform speed universally in a horizontal plane by the drive mechanism D which includes a vertical drive wheel W that tangentially and frictionally engages the horizontal surface of a machine bed M constituting a part of the frame F. The machine bed M also provides a surface upon which a templet A, such as a drawing or a blueprint, may be laid or secured or upon which the outline to be reproduced may be drawn. The tracer mechanism T follows the outline of the templet and automatically controls the position of the drive wheel W which thereby controls the direction of movement of the tool or blowpipe B. This automatic control means includes a photocell P of any standard type upon which the tracer T focuses an enlarged image of the contour line of the templet A; and the varying impulses from the photocell, suitably magnified through an amplifier R, actuate a reversible electric motor G which controls the angular position of the drive wheel W and consequently the angle of the direction of its movement with respect to the outline. Accordingly, when the tracer T has been focused on the outline to be reproduced and the electric circuit of the photocell P has been properly adjusted, the tool B will be propelled and guided to make an exact reproduction of the templet when the several electric circuits are closed and the wheel W is tangentially in frictional engagement with the machine bed. The control system automatically maintains the wheel W in its exact relation to the templet outline and any tendency to deviate therefrom is instantly detected by the photocell and counteracted by the variations thereof from its predetermined normal adjustment.

Referring more particularly to Figs. 1 and 2, the frame F and the supporting mechanism S are in general similar to those disclosed in Patent No. 1,774,865. The frame F comprises a plurality of supporting posts or legs 12 which carry a pair of lower or main rails 13 which extend longitudinally of the side edges of the machine bed M. A lower carriage 14 comprises a pair of channels 20, each fitted with a pair of flanged wheels 15 for guiding the lower carriage along the rails 13. Suitable stops 16 at the ends of the rails 13 limit the travel of the lower carriage.

A pair of auxiliary rails 17 are secured to the upper sides of the channels 20 substantially perpendicular to the rails. An upper carriage 18 is provided with a set of flanged wheels 19 for guiding the upper carriage along the transverse rails 17. The upper carriage 18 is therefore movable universally in any direction in a plane parallel to the machine bed.

A prime mover such as an electric driving motor 24 is connected through suitable speed-reducing mechanism to the drive wheel W to rotate the latter at a constant speed and thereby propel the supporting structure S. The upper carriage 18 is provided with a horizontal platform 22 upon which is mounted a transmission housing 23. The motor 24, provided with a governor 25, is secured to one side of the housing 23. A worm 26 on the motor shaft meshes with a worm wheel 27 mounted on a shaft which projects from the housing 23. Speed reduction mechanism similar to that disclosed in Patent No. 1,774,865, above referred to, is enclosed within the transmission housing, and is operatively connected to a downwardly depending transmission shaft 31, so that the latter is free to move axially while maintaining operative connection with the speed reduction mechanism. A vertical tube 28 is rigidly secured to the platform 22, as by the fixed flange 37 shown in Fig. 1. Axially slidable and pivotal within the tube 28, is an inner sleeve 29 which is preferably keyed for axial movement with respect to the housing 23. The sleeve 29 serves as a support and a mounting means for the drive wheel W. Engagement of the shaft 31 with the drive wheel W is preferably made through a bevel pinion 32 enmeshed with a bevel gear 21 coaxially secured to the drive wheel W as shown in Fig. 6.

A reversible electric steering or guiding motor G, secured to the platform 22, has its armature shaft connected through a speed reducing mechanism 33 to a relatively long spur pinion 34 which meshes with a spur gear 35 rigidly secured about the periphery of the inner sleeve 29.

The transmission housing 23 is flanged at 30 to provide a bearing surface for thrust bearings 36 which take the weight of the transmission housing and its associated equipment and allow it to rotate through any angle as a unit, in response to the rotary motion imparted to it by the sleeve 29 as the gear 35 rotates. Through the use of the long pinion 34 and the long pinion forming part of the transmission it is possible to lift the sleeve 29, shaft 31, drive wheel W and gear 35 as a unit with respect to the housing 23 to disengage the wheel W from the bed M. The edge of the drive wheel W is preferably knurled or otherwise notched, as shown in Fig. 2, to provide better traction while in rolling engagement with the table M.

The tracing mechanism T is mounted in any convenient manner, preferably to the platform 22 as by bracket 39. Secured to the bracket 39 is a sleeve 41 which fits the tracer tube 42. The tube 42 floats within the sleeve 41, being free to move axially, but not pivotally with respect to the sleeve.

The lower end of the tube 42 is fitted with a detachable lens or objective 43, similar to the field piece of a microscope, and may be interchanged with objectives of different powers. The tube 42 is held in adjustable spaced relation to the table or machine bed M to allow for proper focusing. In the drawings, a bracket 44 is shown secured to the lower portion of the tube 42. A threaded bushing 45 engages a threaded aperture in the bracket 44. A spindle 40 depends from within the threaded bushing and terminates at its lower extremity in a horizontal sleeve for receiving the axle of guide wheels 46. By this construction, it is possible through the adjustment of the threaded bushing 45 to selectively position the objective 43 at a suitable distance from the table upon which the templet is placed and to obtain proper focusing. The contour line is thus maintained at a fixed distance from the objective 43 substantially independent of irregularities in the surface of the templet, or table.

Secured to the sleeve 41 and preferably angularly disposed with respect to the axis is a downwardly extending post 47. The post is provided with a hollow portion to receive a mounting rod 48 which is secured through a swivel joint 49 to an illuminator 51. The position of the illuminator 51 may be adjusted by means of a locking screw 50 projecting through the wall of the post 47 and engaging the rod 48, as well as by the swivel joint 49. The illuminator is preferably provided with a low-voltage, high candle-power lamp having a lens 52 at its lower end for focusing a beam of light upon the templet. Fig. 3 shows the relation of the tracer T to a drawing or templet A provided with a contour or outline of a color contrasting with the background or field of the templet. The beam of light falling upon the templet is reflected in part through the lens or objective 43 which focuses an image of the line, forming a part of the templet, upon a light sensitive cell P (best seen in Fig. 4) positioned at the upper extremity of the tube 42. The light sensitive cell P is preferably of the photoelectric type capable of producing variable electrical pulsations in response to variations in light which fall upon it. The electrical impulses from the photoelectric cell P excite the grid circuit or modify the bias voltage of a conventional thermionic amplifier R. A milliammeter 60 forms part of the amplifier and is preferably inserted in the positive plate current lead, in series with the output connections. As many stages as desired may be employed in the amplifier to give sufficient output power to actuate relays in the control mechanism.

In Fig. 4 the power output terminals 78 and 79 of the final tube are connected to the coil 55 of a sensitive direct current relay 56. The relay 56 comprises in effect two single-pole single-throw switches, and one single-pole double-throw switch. All of these switches have their respective poles 106, 107, and 108 connected to wire 104 which terminates at a master switch 57 either manually or mechanically operated. The remaining contacts of all switches are connected in series with the coils of respective alternating current relays 58, 59, 61 and 62. The opposite ends of all relay coils, and one side of the switch 57 respectively connect through wires 122 and 123 with opposite terminals of the secondary winding of a step-down transformer 63.

The primary side of the transformer 63 is connected through leads 102 and 103 to a suitable source of alternating current for example at 110 volts, 60 cycles, which also provides the power to operate the amplifier R. One of the leads 64 of the alternating current source connects with a series field winding 65 of the guiding motor G shown in Fig. 1. The opposite end of the series field winding 65 connects with the contacts 67 and 68 of the respective relays 59 and 61 through wire 66.

An armature 69 pivotally mounted adjacent to contact 68 is connected through wire 54 to another armature 71 next to a second contact 72 on relay 59. Similarly, an armature 73 connects through wire 74 to a second armature 75 for making connection with contact 76 on relay 61. Contacts 72 and 76 are joined together by means of wire 77. Armatures 75 and 73 make contact with brush 82 on the motor armature 80 through wire 84; similarly, armatures 71 and 69 make contact with brush 81 through wire 83. Contacts 76 and 72 are joined to wire 86 which connects with one end of the second field winding 85 of the motor G. The opposite end of the second field winding 85 connects with resistor 87 by means of wire 88.

The resistor 87 is shunted in part by a variable contact member 89. The terminals of the resistor 87 are connected through wires 93 and 94 to the armature 91 and contact 92 respectively, forming part of the relay 62. Wires 95 and 96 also connect the extremities of the resistor 87 with armature 97 and contact 98, forming a part of the relay 58. A wire 99 connecting with one end of the resistor 87 and with wires 94 and 96, joins the resistor with the opposite side of the input alternating current line 101.

A wire 104 extends between switch 57 and the entire armature 105 of the relay 56. An adjustable spring 100 secured to the armature 105 holds the armature in neutral position against the action of normal current which flows through coil 55 when the tracer is adjusted to the neutral position. The armature 105 is divided into three separate poles as previously mentioned, represented in Fig. 4 of the drawings by numbers 106, 107 and 108. A contactor 109 is located at the extremity of pole 106. A double contactor 111 is formed at the extremity of pole 107 and a third contactor 112 is located at one end of pole 108. Directly adjacent to contact 109 on pole 106 is a contact 113 which connects through wire 114 with the coil of the relay 58. Similarly, adjacent to contact 112 at the extremity of pole 108 is a contact 115 which connects through wire 116 with the coil of the relay 62. A duplicate set of contacts 117 and 118 are located on either side of the central pole 107 of the relay 105 and connect respectively through lines 119 and 121 to the coils of the relays 59 and 61. The return connections from the relays 58, 59, 61 and 62 are all connected through line 122 to one secondary terminal of the transformer 63.

Returning again to Figs. 1 and 2, a blowpipe mounting arm or tool holder 124 is secured to the carriage 18 in any desirable manner preferably by means of a strap 125 secured to the upper carriage. An adjusting screw 126 permits the arm to be adjustably secured to the platform of the upper carriage 18. If desired, additional arms may be connected in a suitable manner to the upper carriage to operate simultaneously. A plurality of such arms are shown in Figs. 1 and 2, mounted preferably at right angles to one another with blowpipes B preferably secured in any suitable manner to the outer extremity of each arm. Figs. 1 and 2, disclosing a preferred embodiment, show the use of a compressed fuel gas blowpipe such as an oxy-acetylene cutting blowpipe. It is to be understood, however, that use may be made of any suitable cutting tool, welding device, such as an electric arc welder, or any other instrument which may be useful in conjunction with the remaining portion of the apparatus to be guided in a predetermined path. The instrument may take the form of a cutting tool such as an oscillating knife, saw, and so forth, and the workpiece may comprise a plurality of layers of material such as fabric, wood, or metal. In this way, many similar elements such as might be used in the construction of furniture, clothing, machinery, and the like, might be accurately and economically formed simultaneously during a single operation. The reproducing tool may otherwise comprise a pyrograph needle, scriber, gouge, or drawing instrument. The invention especially adapts itself for use with an electric arc or gas flame for heat-treating or flame-hardening metal about an irregular course. In the cutting machine herein shown for illustrating the invention, a workpiece C comprises a blank of metal from which is to be cut a reproduction of the contour of the templet A shown in Fig. 3. A work bench 128 forms a suitable support for the blank C and allows the operator to conveniently observe the progress of the work.

A wide variation in methods and materials may be used in forming templets for use in conjunction with this invention. The desired outline may be drawn or traced upon the machine bed with crayon, chalk or other suitable marking means. The templet may be cut from dark paper, a cardboard, or other similar sheet material and may be laid upon a light background on the machine bed. Instead of reflected light I may use transmitted light in the operation of the device.

Ordinarily a pencil drawing, ink tracing or a blueprint is used as a templet. If the original templet is made upon translucent material such as vellum or tracing linen, additional copies may easily be made by any standard contact printing process. During operation the objective 43 of the tracer is positioned closely adjacent to the contour line or the templet but is spaced slightly from it. There is thus no actual sliding contact between tracer and templet, and there is practically no wear or destruction of the templet during its use, and but little tendency for movement of the templet with respect to the machine bed during operation as the wheels 46 provide rolling contact.

In operation, the lens 43 of the tracer is normally located directly over the line in a position diagrammatically shown in Fig. 5a. The lines are shown in Fig. 5a, Fig. 5b, Fig. 5c, Fig. 5d, and Fig. 5e on an enlarged scale for purposes of illustration. The small circle on each of the lines represents the area observed by the lens and the larger broken-line circle represents the portion of the templet illuminated by the source of light 51. When in the normal position, the lens partially overlaps the shaded portion of the line as indicated in Fig. 5a. Preferably one edge of the line diametrically bisects the aperture located on the optical axis of the light-sensitive tracer.

In order to start the machine in operation, the drive wheel W is preferably lifted from the table M with the switch 57 in the open position. With a suitable templet A placed in position upon the table, the operator grasps the tracer, which is supported by the carriage 18 and is free to move universally in a plane parallel to the table, and carefully approaches the contour line until the field observed by the lens is preferably directly over half of the line as shown in Fig. 5a. In case the templet comprises a dark line upon a light field or a dark body surrounded by a light background the tracer is preferably brought leftward toward the line when looking at Fig. 5a or leftward toward the outside of the contour in the case of a dark body templet, until the circular field observed by the photoelectric cell, or the optical axis of the tracer is intercepted by the outline as shown in Fig. 5a. In the event that the templet comprises a light line upon a dark field, as would ordinarily be the case if a blueprint were used, the tracer is brought toward the line from the right-hand side until the field assumes a position opposite to that shown in Fig. 5a. The normal position of the tracer with respect to the right or left side of the contour or line, is a function of proper operation as will be better understood from the detailed description of operation which follows. In all of the instances shown in Figs. 5a, 5b, 5c, 5d, and 5e the direction of motion of the tracer is assumed to be downward when looking at the figures, as indicated by the arrows adjacent to the respective lines. The operator is informed when the field observed by the tracer is in the normal position, as the response of the photocell produces a neutral or half-scale reading in the milliammeter 60.

The speed of the driving motor 24 is first adjusted so that the drive wheel W may cause the blowpipe to progress with respect to the blank at a sufficiently slow speed so as to give complete cutting of the metal without danger of burning. Each workpiece or blank $\bar{C}$ is next adjusted upon the work bench 128 until each blowpipe is in a proper position with respect to the blank. The drive wheel W may next be lowered into its operating position in frictional engagement with the table M, and the switch 57 closed.

It is desirable that the switch 57 be manually or mechanically opened whenever adjustments are being made upon the machine, as the guiding mechanism will then become inoperative. After the drive wheel has been lowered in position and the switch 57 closed, the blowpipe or blowpipes may be adjusted for operating conditions, ignited, and the switch controlling the drive motor 24 may be closed to set the drive wheel W in motion.

With the field of the tracer in the position shown in Fig. 5a an image of one-half of the dark line and one-half of the light background, or of one half of the light line and one-half of the dark background, as the case may be, is focused, preferably in an enlarged size, upon the photocell. With the illuminator properly focused, the amount of light which the photocell receives at this position corresponds to a normal condition, characterized by the fact that the milliammeter pointer is in a neutral position and all of the relays shown in Fig. 4 are in a neutral or open position. If desired, to compensate for variable conditions introduced by substitution of the objective 43 and possible variation in the light intensity produced by the illuminator 51, a gain or output control 60' of any conventional design may be provided in conjunction with the amplifier R, as shown in Fig. 1, so that the milliammeter may be adjusted to a neutral position for all lighting conditions when the field of the objective is in the position shown in Fig. 5a.

As the drive wheel W rotates slowly, the field observed by the tracer will eventually wander from its normal position on the line. Should the field move toward the left slightly away from the line as shown in Fig. 5b, the photo-electric cell will receive more light due to the fact that the area observed by the tracer becomes predominantly light. In the case of a templet employing light lines upon a dark background, this same condition prevails by virtue of the field moving in the same direction as in the previous case more completely into the light line, so that the operation in either case is identical.

The action of the control mechanism in response to the variation in light occurring by movement of the field transversely to the left as seen in Fig. 5b, can best be understood by referring to Fig. 4. The increased light intensity upon the photocell produces a corresponding change in its electrical characteristics which are imposed upon the input side, or grid circuit of the amplifier, resulting for instance, in a decrease of the plate current passing through the coil 55 of the relay 56. The solenoid thus becomes partly deenergized, completing the connection between contactor 111 and contact 118 through the action of spring 100, and energizing the alternating current relay 61. Consequently, armatures 69 and 75 close, allowing the line voltage to be imposed upon the armature of the motor G connected between the series field windings 65 and 85. The resistor 87 serves as a means for controlling the speed of the guiding motor G. Should the field observed by the tracer tend to leave the contour line completely, and thus be fully exposed to the light background, the reaction on the photocell produces a further decrease in the current passing though coil 55 resulting in the closing of contactor 112 with contact 115. Under these conditions, the circuit of the low voltage alternating current relay 62 is completed in series with the secondary winding of the transformer 63 and armature 91 is attracted to the contact 92, short circuiting the resistor 87, thereby increasing speed and therefore the response of the guiding motor G. When the electric motor G is thus energized, gear 35 rotates, pivoting the drive wheel W in a direction necessary to allow the tracer to return to its normal position.

Should the area observed by the tracer move from its normal position to the right as shown in Fig. 5c, in the case of either a dark or light line templet, a greater proportion of darkened area is exposed to view and as a result, less light is reflected upon the photocell. Under these conditions more current flows in the coil 55 of the relay 56. The armature 105 of the relay 56 in response to the increased energizing of the coil 55 moves against the tendency of the spring 100 so that contactor 111 engages contact 117 to energize the coil of the relay 59. As a result armatures 71 and 73 engage the contacts 67 and 72 to again supply a source of alternating current to the armature 80 but in a direction opposite to that which occurred in the previous instance. As the direction of flow in the field windings remains unchanged, the relation between the field windings and the armature is thus reversed, and the motor G rotates in the opposite direction.

A further variation from the normal current in the coil 55 as would be caused by the tracer being exposed completely to a dark surface causes contactor 109 to touch contact 113 energizing the alternating current relay 58. The circuit is thus completed between armature 97 and contact 98 to short circuit the resistor 87 and to again produce an increased speed of the motor G and a quicker response of the guiding means in returning the tracer to the normal position.

It will thus be seen that as the tracer moves in either direction from the neutral direction tangential to the line, a change is produced in the illumination of the photocell P, and the light impulses are transformed into electrical energy of variable intensity. The electrical energy is amplified and operates a reversible electric motor for controlling the directional position of the drive wheel W and a consequent shifting in the direction of movement of the tracer so that the tracer may be returned to its normal position.

The manner in which the tracer turns a corner of the templet outline is shown in Figs. 5d and 5e. By observing Fig. 5d, it will be seen that the area or field observed by the tracer is considered to be moving with respect to the line in the direction indicated by the arrow. The field continues in this same direction until it crosses the horizontal portion of the line and exposes a greater proportion of darkened area, at which time the photocell control actuates the guiding motor in a direction that will cause the field observed by the tracer to emerge at the upper part of the horizontal portion of the templet line. The field ordinarily continues a little further out into the light background, where it is again returned to the top of the line. After several such oscillations of minute magnitude, the tracer again continues along its course in a neutral position. The operation of the device in the case illustrated in Fig. 5e is similar to that already described. In the latter case, however, as the tracer field continues downwardly from the position shown, it uncovers more light area and the guiding mechanism is actuated so as to cause the field to move toward the right, and hence around the corner. The photocell is so sensitive to fluctuations in light that the field observed by the tracer barely moves from its normal position before the guiding mechanism is actuated. Thus, in any case, the actual movement of the tracer area from the normal position is so slight as to be negligible, and the direction of movement of the tracer is maintained substantially tangential with respect to the contour by the photoelectric cell control.

Contacts 117 and 118 are spaced nearer to the contactor 111 than the contacts 113 and 115 are spaced from the contactors 109 and 112, so that the former contacts are the first to close. The motor G is herein described as an electric motor designed to operate from a source of alternating current electricity but it may work equally well if operated from a direct current source.

The objective or field lens 43 is interchangeable with similar types having different focal lengths. As the focal length of the objective decreases the width of line necessary in the templet may also be decreased, without affecting the operation. Of course, objectives of extremely short focal length have a relatively small aperture and an increase in either the light intensity or in the amplifications of the electrical impulses is necessary to produce satisfactory results. With the focusing means disclosed, it is possible to position the various objectives at a suitable distance above the templet so that an image may be formed on the photocell.

It is to be understood that the apparatus disclosed herein is merely illustrative of one embodiment of the invention and is not to be construed in a limiting sense as numerous changes may be made without departing from the broad principles of the invention.

I claim:

1. The process of reproducing a pattern which comprises propelling a reproducing instrument in any and varying directions in a plane parallel to a flat work surface, and controlling the direction of movement of said instrument in said plane photoelectrically by light from said pattern.

2. The process of automatically tracing a closed outline which comprises positioning a light-sensitive cell adjacent to said outline; moving said cell with respect to the said outline, and controlling the angle of the direction of movement of said cell with respect to said outline by the responses of said light-sensitive cell to light reflected from said outline.

3. The process of reproducing a contour comprising moving a light-sensitive cell generally along said contour, maintaining the direction of such movement substantially tangent to said contour by the responses of said light-sensitive cell to light reflected from said contour, and moving a reproducing tool under the control of said cell in a course similar to that of the light-sensitive cell.

4. In the process of automatically reproducing a contour formed upon a background of contrasting color, the steps comprising positioning a photoelectric cell in spaced relation to said contour, supporting said cell for movement in varying directions at substantially a fixed distance from the surface in which said contour is disposed, forming an image of at least a portion of said contour upon said cell, positioning a reproducing tool with respect to said cell, and controlling the direction of movement of said tool and said cell by the responses from said cell.

5. The process of performing a mechanical operation upon material along a predetermined path which comprises positioning a tool adjacent to material upon which a mechanical operation is to be performed; moving a tracer adjacent to an outline which simulates the predetermined path; exposing a photoelectric cell to the outline; guiding the tracer about the outline by the responses from the photocell; and securing the tool in spaced relation to the tracer so that the tool moves in a path similar to that described by the tracer.

6. The process of heat-treating metal along a predetermined path comprising supporting a photoelectric cell for movement at a fixed distance from the surface of a pattern having thereon an outline in a color contrasting with its background, and simulating the predetermined path; moving the photoelectric cell generally along said outline at a substantially constant speed; regulating the direction of movement of the photoelectric cell by responses from the photoelectric cell, whereby the photoelectric cell follows a course described by the outline; and securing a heat-treating tool adjacent to a metal member to be treated and in spaced relation to the photoelectric cell, so that the heat-treating tool moves adjacent to the metal in a path similar to that described by the photoelectric cell.

7. The process of treating material along a predetermined path, comprising locating a light-sensitive guiding means adjacent an outline which is illuminated at least in the part adjacent said light-sensitive means, said light-sensitive means being so disposed as to receive light from a limited portion of said illuminated outline, said outline simulating said predetermined path; moving said light-sensitive means at a constant speed at a fixed distance from the surface in which said outline is disposed; controlling the direction of movement of said light-sensitive means by light received by it from the limited illuminated portion of said outline toward a position in which a predetermined intensity of light is received, whereby said light-sensitive means follows said outline; securing a material-treating implement in spaced operative relation to said light-sensitive means, whereby the material-treating implement moves in a path similar to that followed by the light-sensitive means.

8. The process of treating a material along a predetermined path comprising, illuminating at least a portion of an outline simulating the desired path and disposed on a background which affects light in a different manner from the outline, locating a light-sensitive means with its optical axis cutting said outline, moving said light-sensitive means at a fixed speed over said background, controlling the direction of movement of said light-sensitive means by variations in the light received from the outline and background so that the light-sensitive means tends to return to a position in which its optical axis cuts said outline; maintaining a material-treating implement in spaced operative relationship to the light-sensitive means; and causing said material-treating implement to move in a path similar to the outline.

9. In a reproducing machine, the combination of means for supporting a stationary surface having a contour line thereon, a tracer including a photoelectric light-sensitive element mounted for movement in any and varying directions over said surface, means for moving said tracer over said surface at a substantially constant speed, means actuated by said light-sensitive element for controlling the angle of direction of movement of said tracer with respect to said contour to cause it to constantly follow a path substantially tangential to said contour line, a reproducing tool, and means operatively connecting said tracer and said tool.

10. In a reproducing machine, the combination of means for supporting a background having a contour thereon, said background and contour affecting light differentially, a tracer including a photoelectric light-sensitive element mounted for universal movement in a plane substantially parallel to said background so that it may be affected by light from said background and contour; means for moving said tracer in such plane with respect to said background; means actuated by said element in response to light received from said background and contour for modifying the direction of movement, whereby said tracer is caused to follow said contour; a reproducing tool; and means operatively connecting said tracer and tool for correlating the movement of said tracer and tool.

11. Welding, heating or cutting apparatus comprising heating means; means for moving said heating means universally in a plane; and mechanism operatively connected to said heating means for controlling the direction of movement in accord with a predetermined outline said mechanism including a photoelectric cell arranged to receive light from said outline, and means for varying the direction of movement of said cell in response to variations in light received by said cell.

12. Heat treating apparatus comprising heating means; means for moving said heating means universally in a plane; and mechanism including a photoelectric cell mounted to receive light reflected from a pattern or outline, and a prime mover actuated by said photo-electric cell for controlling the direction of movement of said heating means and said cell in accord with said pattern or outline.

13. In welding or cutting apparatus comprising heating means and means for moving said heating means universally in a plane; mechanism including a photoelectric cell mounted to receive light reflected from a pattern, and a steering motor in circuit with said photoelectric cell for controlling the direction of movement of said heating means and said photoelectric cell in accord with said pattern.

14. In reproducing apparatus, the combination of a reproducing tool, a movable carriage supporting said tool, said carriage being movable in any direction in a plane; and mechanism for moving and guiding said carriage; said mechanism comprising a light-sensitive cell adapted to be focused on and to follow the pattern or outline to be reproduced, and a steering traction wheel controlled by said light-sensitive cell.

15. In reproducing apparatus, the combination of a tool adapted to reproduce a pattern; means for supporting said tool for movement universally in any direction in a horizontal plane; means for propelling such supporting means to move said tool at a uniform speed; direction-controlling mechanism to vary the direction of movement of said tool and said supporting means in accord with the outline of said pattern; and a light-sensitive cell carried by said supporting means and exposed to the outline of said pattern, said cell being operatively connected with said mechanism.

16. In a reproducing apparatus, the combination of a support movable in directions parallel to a supporting surface; a tool carried by said support; means for propelling said support; and mechanism for guiding said support along a path similar to a predetermined outline, said mechanism comprising electrically actuated means for steering said propelling means, and a photo cell adapted to be exposed to said outline for controlling the circuit of said electrically actuated means.

17. In apparatus for cutting, welding or heating, the combination of a cutting, welding or heating instrument utilizing high temperature heat; means for supporting said instrument for movement universally in any direction in a horizontal plane; means for propelling such supporting means to move said instrument at a uniform speed; and mechanism, including a light-sensitive cell focused on an outline and adapted to receive light reflected therefrom, for controlling the movements of such supporting means to vary the direction of movement of said instrument in accord with the variations in the quantity of light reflected from said outline onto said light-sensitive cell.

18. In combination with a templet having a contour line, tracing apparatus comprising a tracer adjacent to but movable away from said contour line means for moving said tracer along said line, and means operative by the motion of said tracer away from said contour line for continually directing said tracer into a predetermined normal position with respect to said contour line.

19. In combination with a templet having a contour line, tracing apparatus comprising a tracer normally positioned adjacent to an edge of said contour line but movable laterally from the normal position means for propelling said tracer along said contour, and means responsive to the motion of said tracer from said normal position to return said tracer to said normal position.

20. Automatic shape-cutting apparatus comprising the combination with a templet having a contour line upon a field reflecting light with an intensity different from said contour line, of a tracer normally positioned over an edge of said contour line, but movable from the normal position, said tracer having a source of light illuminating a portion of said contour line and said field adjacent to said tracer, and light-sensitive means exposed to said illuminated portion and responsive to variations in the light intensity upon said light-sensitive means occasioned by lateral movement of said tracer with respect to said contour line; guiding means controlled by said light-sensitive means for varying the direction of movement of said tracer; driving means for propelling said tracer; and a cutting tool associated with said tracer.

21. Automatic shape-cutting apparatus comprising the combination with a templet having a contour line upon a field reflecting light with an intensity different from said contour line, of a carriage free to move in any direction parallel to said templet; tracing mechanism secured to said carriage, said mechanism being responsive to variations in the amount of light reflected thereon by lateral movement with respect to said contour line, said tracing mechanism being normally adjacent to said line; guiding means actuated by the responses of said tracing mechanism for controlling the direction of movement of said tracing mechanism; propelling means for moving said tracing mechanism; and a cutting tool associated with said carriage.

22. In an automatic shape-cutting apparatus having a machine bed and a templet having a contour line on a field, the line and the field reflecting different quantities of light impinging thereon, the combination of a carriage free to move in any direction parallel with said bed; means for driving said carriage; at least one cutting tool secured to said carriage; a light-sensitive tracer secured to said carriage and positioned to receive light reflected from said templet; carriage guiding means; and control means for said guiding means, said control means being actuated by the response of said tracer to the variation in light reflected thereto from said templet upon departure of said tracer from said contour line.

23. An automatic shape-cutting apparatus comprising a table for receiving a flat templet having a contour line on a field reflecting light with an intensity different from said contour line, a carriage universally movable in a plane parallel to said table; driving means associated with said carriage for moving said carriage with respect to said templet; at least one blowpipe secured to and movable with said carriage; a source of light for illuminating said templet; a tracer secured to said carriage for normal positioning adjacent to the line of said templet, said tracer including a photoelectric cell, delivering electrical pulsations in response to variations in the light intensity upon said cell occasioned by movement of said tracer away from said line; and guiding means associated with said driving means for changing the direction of motion of said carriage in response to said electrical pulsations to return said tracer into close proximity with said line.

24. In combination with a templet having a contour line surrounded by a field having a different light reflecting value, automatic tracing mechanism comprising a source of light for illuminating a portion of said templet; a tracer free to move with respect to said templet but normally positioned over an edge of said contour line; photoelectric means secured to said tracer for delivering electrical pulsations in response to the variations of light intensity on said photoelectric means occasioned by lateral movement of said tracer with respect to said contour line; guiding means actuated by said electrical pulsations for urging said tracer to such normal position; and means for accelerating the action of said guiding means when said tracer moves excessively with respect to said line.

LLOYD W. YOUNG.